(12) United States Patent
Mountz et al.

(10) Patent No.: US 7,402,018 B2
(45) Date of Patent: Jul. 22, 2008

(54) INVENTORY SYSTEM WITH MOBILE DRIVE UNIT AND INVENTORY HOLDER

(75) Inventors: Michael C. Mountz, Cambridge, MA (US); Raffaello D'Andrea, Ithaca, NY (US); John A. LaPlante, Bow, NH (US); David P. Lyons, II, Palo Alto, CA (US); Peter K. Mansfield, Bellevue, WA (US); Burl W. Amsbury, Boulder, CO (US)

(73) Assignee: Kiva Systems, Inc., Burlington, MA (US)

( * ) Notice: Subject to any disclaimer, the term of this patent is extended or adjusted under 35 U.S.C. 154(b) by 413 days.

(21) Appl. No.: 10/965,523

(22) Filed: Oct. 14, 2004

(65) Prior Publication Data
US 2006/0210382 A1    Sep. 21, 2006

(51) Int. Cl.
*B62B 11/00*    (2006.01)
(52) U.S. Cl. ............ 414/331.06; 211/95; 280/47.35
(58) Field of Classification Search ............ 414/331.06, 414/331.14, 446, 471, 540, 607, 608, 623, 414/629; 211/95
See application file for complete search history.

(56) References Cited

U.S. PATENT DOCUMENTS

| | | | | |
|---|---|---|---|---|
| 3,549,034 A | * | 12/1970 | Guerrico | 414/446 |
| 3,641,945 A | * | 2/1972 | Tillander et al. | 312/272.5 |
| 3,689,106 A | * | 9/1972 | Young | 410/1 |
| 3,727,946 A | * | 4/1973 | Hearn | 280/408 |
| 3,920,093 A | * | 11/1975 | Moran et al. | 180/21 |
| 3,938,608 A | * | 2/1976 | Folco-Zambelli | 180/21 |
| 4,067,265 A | * | 1/1978 | Watson | 108/7 |
| 4,375,354 A | * | 3/1983 | Henriksson | 432/239 |
| 4,413,693 A | * | 11/1983 | Derby | 180/343 |
| 4,433,881 A | * | 2/1984 | Witten et al. | 312/107.5 |
| 4,669,047 A | | 5/1987 | Chucta | 364/468 |
| 6,046,565 A | | 4/2000 | Thorne | 318/587 |
| 6,181,553 B1 | * | 1/2001 | Cipolla et al. | 361/687 |
| 6,491,127 B1 | * | 12/2002 | Holmberg et al. | 180/252 |
| 6,634,043 B2 | * | 10/2003 | Lamb et al. | 5/600 |

(Continued)

FOREIGN PATENT DOCUMENTS

EP    0 458 722 A1    11/1991

(Continued)

OTHER PUBLICATIONS

PCT International Search Report and Written Opinion in International Application No. PCT/US204/000971, dated Aug. 2, 2004, 17 total pages.

(Continued)

*Primary Examiner*—Charles A Fox
(74) *Attorney, Agent, or Firm*—Baker Botts L.L.P.

(57) ABSTRACT

A system for transporting inventory includes an inventory holder and a mobile drive unit. The inventory holder includes a frame capable of storing inventory items and a docking plate capable of receiving a docking head from underneath. The mobile drive unit, includes a docking head capable of coupling to the docking plate and a drive module capable of propelling the mobile drive unit. The mobile drive unit is further capable to move the inventory holder when the docking head is coupled to the inventory holder.

20 Claims, 9 Drawing Sheets

U.S. PATENT DOCUMENTS

| | | | |
|---|---|---|---|
| 6,652,213 B1 * | 11/2003 | Mitchell et al. | 414/284 |
| 6,672,601 B1 * | 1/2004 | Hofheins et al. | 280/47.34 |
| 6,748,292 B2 * | 6/2004 | Mountz | 700/214 |
| 6,851,170 B2 * | 2/2005 | Lappen et al. | 29/464 |
| 6,870,362 B2 * | 3/2005 | Thurmaier | 324/158.1 |
| 6,895,301 B2 * | 5/2005 | Mountz | 700/215 |

FOREIGN PATENT DOCUMENTS

| | | |
|---|---|---|
| EP | 1 251 083 A1 | 10/2002 |
| GB | 2 113 063 A | 8/1983 |

OTHER PUBLICATIONS

Noah Shachtman, "A Ware of Robots, All Chattering on the Western Front," *The New York Times*, http://www.nytimes.com, Jul. 11, 2002, 4 pages.

Steven Johnson, "Emergence the Connected Lives of Ants, Brains, Cities, and Software," Part 2 "Street Level," *Scribner*, 2001, pp. 73-100.

Kevin Kelly, "New Rules for the New Economy," Chapter 1—"Embrace the Swarm," *Viking*, 1998, pp. 9-22.

David Payton, "Pheromone Robotics," Presentation given to the Defense Advance Research Project Agency in Nashville, TN, *HRL Laboratories/Sony Brook State University of New York*, Jul. 17, 2001, 32 pages.

David Payton, et al., "Progress in Pheromone Robotics," *HRL Laboratories, LLC*, 2001, 9 pages.

David Payton et al., "Autonomy-Oriented Computation in Pheromone Robotics," *HRL Laboratories, LLC*, 2001, 9 pages.

David Payton et al., "Pheromone Robotics," *HRL Laboratories, LLC*, 2001, 11 pages.

PCT Notification of Transmittal of the International Search Report and the Written Opinion of the International Searching Authority, or the Declaration, in International Application No. PCT/US05/34183, dated Jan. 30, 2007, 10 pages.

* cited by examiner

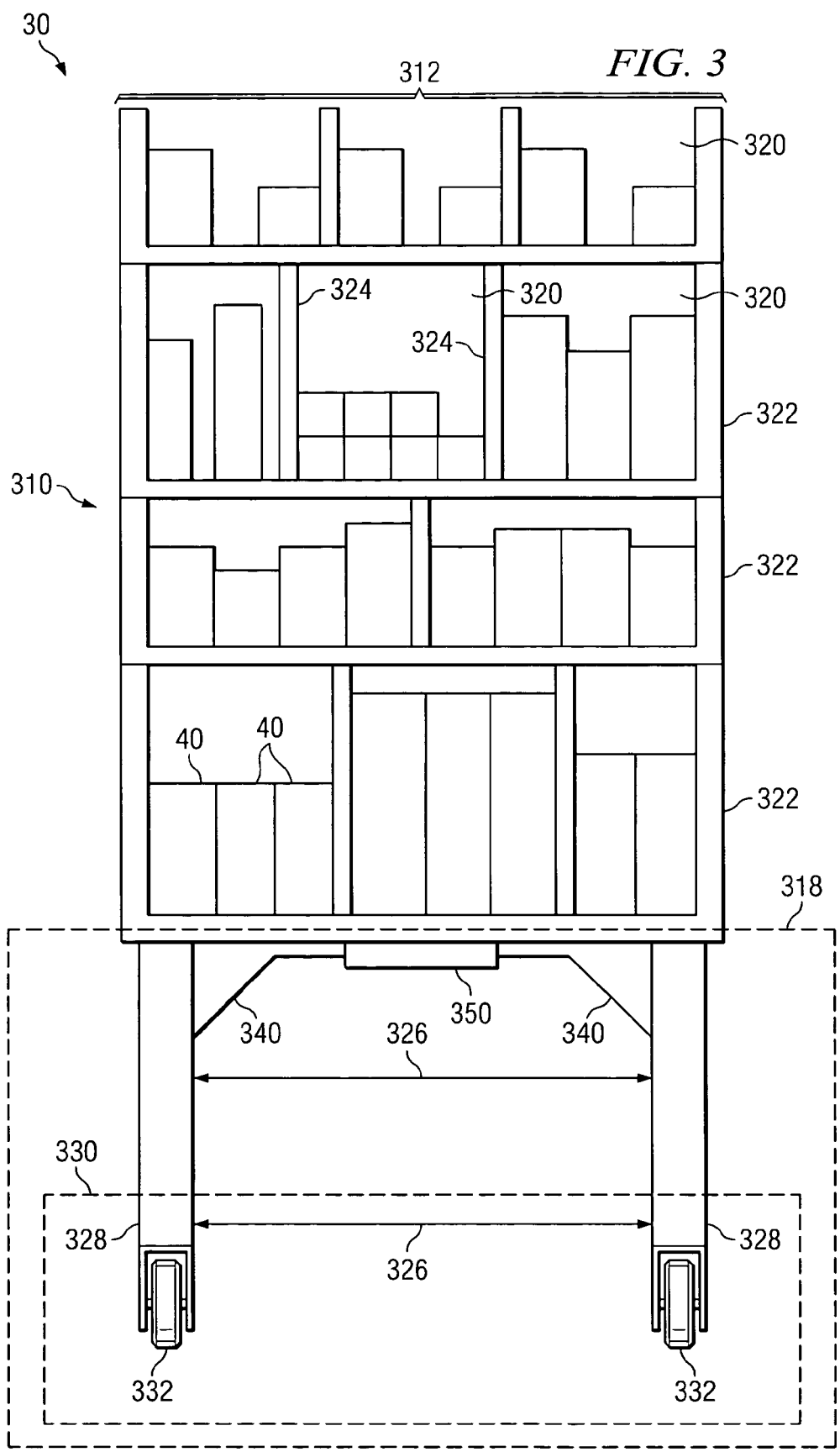

INVENTORY SYSTEM WITH MOBILE DRIVE UNIT AND INVENTORY HOLDER

TECHNICAL FIELD OF THE INVENTION

This invention relates in general to an inventory system, and more particularly, to an inventory system that includes a mobile drive unit and an inventory holder.

BACKGROUND OF THE INVENTION

Modern inventory systems, such as those in mail-order and e-commerce warehouses, airport luggage systems, and custom-order manufacturing facilities, face significant challenges in providing fast, accurate responses to requests for inventory items. In recent years, automation has improved the speed and efficiency of storing and retrieving inventory items within such systems. However, automation often results in rigid inventory systems that are neither scalable nor easily adapted to changing system requirements. Additionally, automated systems often result in inefficient use of space, making automated solutions infeasible in many situations.

SUMMARY OF THE INVENTION

In accordance with the present invention, the disadvantages and problems associated with inventory systems have been substantially reduced or eliminated. In particular, a mobile inventory system is provided that includes a mobile drive unit and a mobile inventory holder.

In accordance with one embodiment of the present invention, a system for transporting inventory includes an inventory holder and a mobile drive unit. The inventory holder includes a frame capable of storing inventory items and a docking plate capable of receiving a docking head from underneath. The mobile drive unit includes a docking head capable of coupling to the docking plate and a drive module capable of propelling the mobile drive unit. The mobile drive unit is further capable of moving the inventory holder when the docking head is coupled to the inventory holder.

In accordance with another embodiment of the present invention, a method of coupling a mobile drive unit to an inventory holder includes positioning a mobile drive unit beneath the inventory holder and raising a docking head of the mobile drive unit. The method further includes adjusting a lateral position of the mobile drive unit and adjusting an orientation of the mobile drive unit. Additionally, the method includes coupling the mobile drive unit to the inventory holder and moving the mobile drive unit and the inventory holder together.

In accordance with another embodiment of the present invention, a method of moving an inventory holder includes coupling a mobile drive unit to an inventory holder and moving the mobile drive unit in a first direction. The method further includes decoupling the mobile drive unit from the inventory holder and rotating the mobile drive unit. Additionally, the method includes coupling the mobile drive unit to the inventory holder and moving the mobile drive unit in a second direction.

Technical advantages of certain embodiments of the present invention include an inventory management system that is easily scalable, that can be easily adjusted to manage inventory items of varying types, sizes and shapes, and that can be operated with minimal human effort. Other technical advantages, including space-saving benefits, may be provided by particular embodiments of the present invention.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 3 illustrates the components of an inventory holder according to a particular embodiment;

DETAILED DESCRIPTION OF THE INVENTION

Figure 1:
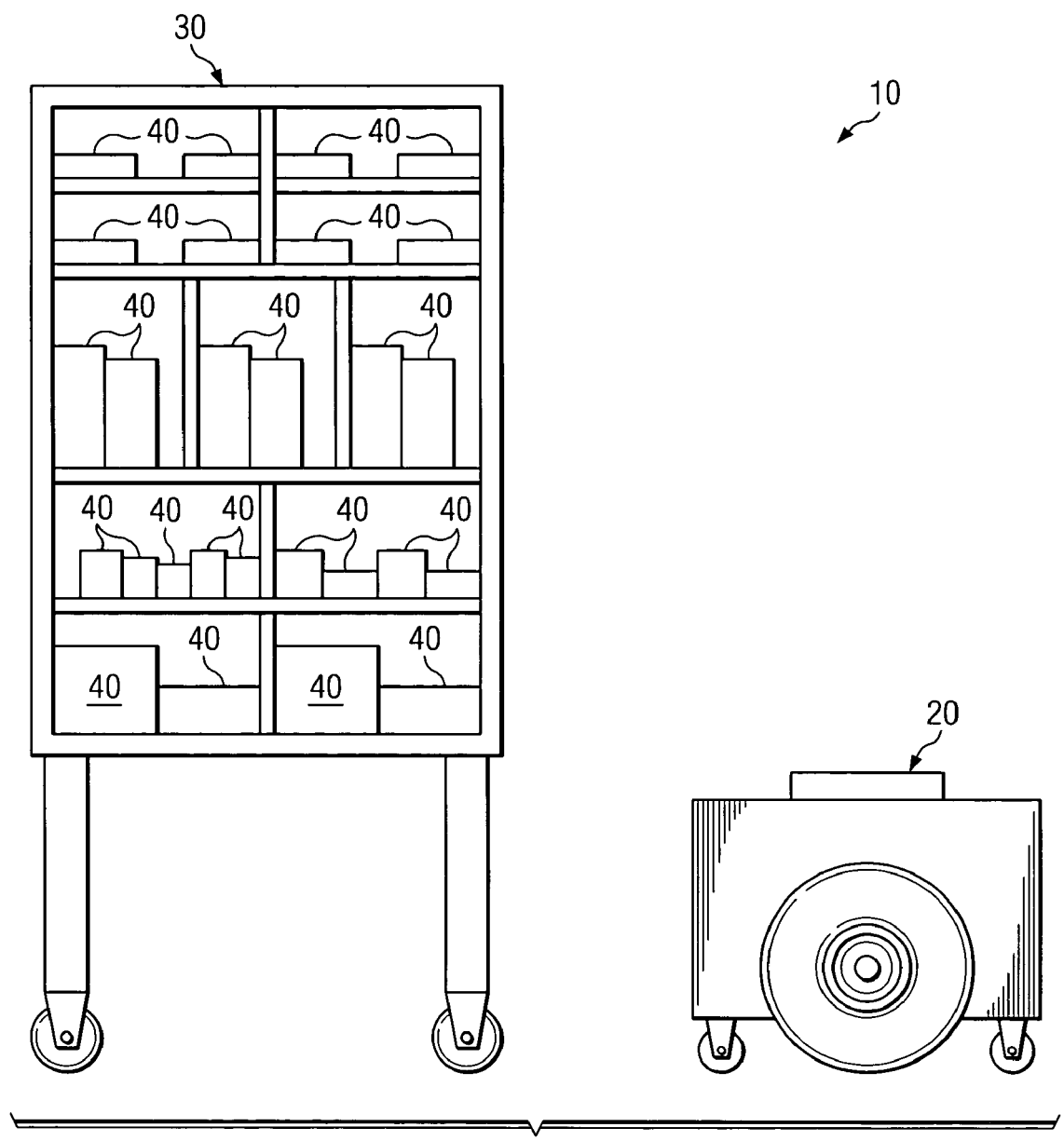
FIG. 1 illustrates an inventory storage system according to a particular embodiment.

FIG. 1 illustrates an inventory system 10 for storing, sorting, and retrieving inventory items 40 that includes a mobile drive unit 20 and an inventory holder 30. Inventory holder 30 stores multiple inventory items 40 of various item types. Mobile drive unit 20 couples to inventory holder 30 and moves inventory holder 30 between designated points within a workspace associated with inventory system 10.

Mobile drive unit 20 is capable of moving within the workspace and, when docked to inventory holder 30, propelling and/or otherwise moving inventory holder 30. Mobile drive unit 20 may include any appropriate components for docking with inventory holder 30 and for propelling mobile drive unit 20 and inventory holder 30.

Furthermore, in a particular embodiment, mobile drive unit 20 may autonomously determine destinations for and control movement of mobile drive unit 20. In particular embodiments, mobile drive unit 20 may additionally or alternatively receive information that identifies destinations for mobile drive unit 20 and/or controls operation of components of mobile drive unit 20 from a management device of inventory system 10, from an operator of inventory system 10, or any other suitable party or device. Mobile drive unit 20 may receive the information through a wireless interface, over a wired connection, or using any other suitable components to communicate with an operator or management device of inventory system 10. In general, movement of mobile drive unit 20 may, depending on the configuration of mobile drive unit 20 and inventory system 10, be controlled, in whole or in part, by mobile drive unit 20, or may be controlled entirely by external devices or parties.

For the sake of simplicity, however, the remainder of this description assumes that mobile drive unit 20 wirelessly receives orders, data, instructions, commands, or information structured in any other appropriate form, referred to here as a "command" or "commands", from a remote component of inventory system 10. These commands identify a particular inventory holder 30 to be moved by mobile drive unit 20 and a destination for that inventory holder 30. Mobile drive unit 20 then controls operation of motors, wheels, and/or other components of drive unit 20 to move mobile drive unit 20 mobile and/or inventory holder 30. The contents and operation of mobile drive unit 20, according to a particular embodiment, are described in greater detail below with respect to FIG. 2.

Inventory holder 30 stores inventory items 40. In a particular embodiment, inventory holder 30 includes multiple storage bins with each storage bin capable of holding inventory items 40. Alternatively, inventory items 40 may hang from hooks within or on inventory holder 30. In general, inventory holder 30 may store inventory items 40 in any appropriate manner within inventory holder 30 and/or on the external surface of inventory holder 30. Inventory holder 30 is capable of being rolled, carried, or otherwise moved by mobile drive unit 20. Furthermore, in particular embodiments, inventory holder 30 may provide additional propulsion to supplement that provided by mobile drive unit 20. Inventory holder 30 may represent one of several inventory holders 30 storing inventory items 40 in inventory system 10. The components and operation of inventory holder 30, according to a particular embodiment, are described in greater detail below with respect to FIG. 3.

Inventory items 40 represent any items, material, or animate or inanimate objects suitable for storage, retrieval, delivery, sortation, and/or routing in an automated inventory, warehouse, manufacturing, and/or parts-handling system. As one example, inventory items 40 may represent items of merchandise stored in a warehouse. Mobile drive unit 20 may retrieve inventory holder 30 containing particular inventory items 40 associated with a customer order to be packed for delivery to a customer or other party.

As another example, inventory items 40 may represent luggage stored in a luggage facility of an airport. Mobile drive unit 20 may retrieve inventory holder 30 containing luggage to be transported, tracked, and/or otherwise processed according to particular policies. This may include selecting particular items of luggage for explosives screening, moving items of luggage associated with a flight that has switched gates, or removing luggage items belonging to passengers who have missed the flight.

As yet another example, inventory items 40 may represent individual components of a manufacturing kit. More specifically, the components may represent components intended for inclusion in an assembled product, such as computer components for a customized computer system. In such an embodiment, mobile drive unit 20 may retrieve particular components identified by a specification associated with a customer order.

As yet another example, inventory items 40 may represent people, for example, in a hospital setting such an inventory hospital system 10 inventory items 40 may represent beds containing particular patients. Thus, inventory system 10 may be configured to provide a safe, effective system for moving hospital beds that limits the potential for injury to patients and reduces the possibility of mistakes arising from human error. In general, inventory items 40 may be any suitable items appropriate for storage in inventory holder 30 as described below.

In operation, mobile drive unit 20 moves inventory holder 30 between locations within the workspace to deliver inventory items 40 to particular locations. The workspace may represent, for example, a work area in a warehouse. As indicated above, mobile drive unit 20 may determine movement of mobile drive unit 20 autonomously and/or based on commands received by mobile drive unit 20. In a particular embodiment, mobile drive unit 20 receives a command identifying a storage location of inventory holder 30 and a destination of inventory holder 30. Mobile drive unit 20 moves to the storage location in response to the command. Mobile drive unit 20 may then dock with inventory holder 30. The docking procedure for mobile drive unit 20, according to a particular embodiment, is described in greater detail with respect to FIG. 5.

Inventory holder 30 may include a braking mechanism, as described further below, that disables movement of inventory holder 30 to prevent inventory holder 30 from inadvertently moving or being moved. In docking with inventory holder 30, mobile drive unit 20 may disengage the braking mechanism of inventory holder 30. As a result of disengaging the braking mechanism, mobile drive unit 20 may subsequently be able to move inventory holder 30.

Mobile drive unit 20 may then move inventory holder 30 to a second location, such as an inventory station, where appropriate inventory items 40 may be selected from inventory holder 30 and packed for shipping or where inventory items 40 may be added to inventory holder 30 to replenish the supply of inventory items 40 available in inventory system 10. In a particular embodiment, mobile drive unit 20 may provide sufficient power to propel both mobile drive unit 20 and inventory holder 30. In alternative embodiments, inventory holder 30 may provide additional power, such as through the operation of motorized wheels on inventory holder 30, to assist mobile drive unit 20 in propelling inventory holder 30 to the second position.

Depending on the configuration and characteristics of mobile drive unit 20 and inventory system 10, mobile drive unit 20 may move inventory older 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first position to the second position. FIGS. 7A-7H illustrate movement of mobile drive unit 20 and inventory holder 30 according to such an embodiment.

After mobile drive unit 20 arrives at the second position, mobile drive unit 20 may maneuver inventory holder 30 in any appropriate manner to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 40. Following maneuvering, mobile drive unit 20 may undock from inventory holder 30 in any appropriate manner.

Alternatively, instead of undocking after arriving at the second location, mobile drive unit 20 may, after appropriate actions are taken at the second location, transport inventory holder 30 back to the first position or to a third position. For example, mobile drive unit 20 may return inventory holder 30 to the original storage location, a new storage location, or another inventory station after a packer has removed particular inventory items 40 from inventory holder 30.

Inventory system 10 may be configured to include any number of inventory holders 30 and mobile drive units 20 to independently optimize the storage capacity and transportation resources available in inventory system 10. Thus, inventory system 10 may provide a flexible system for moving inventory items 40. Additionally, particular embodiments of inventory system 10 may be configured to utilize particular techniques for moving inventory holder 30 that provide space-saving benefits to inventory system 10, as described in greater detail in FIGS. 7A-7H.

Figure 2A:
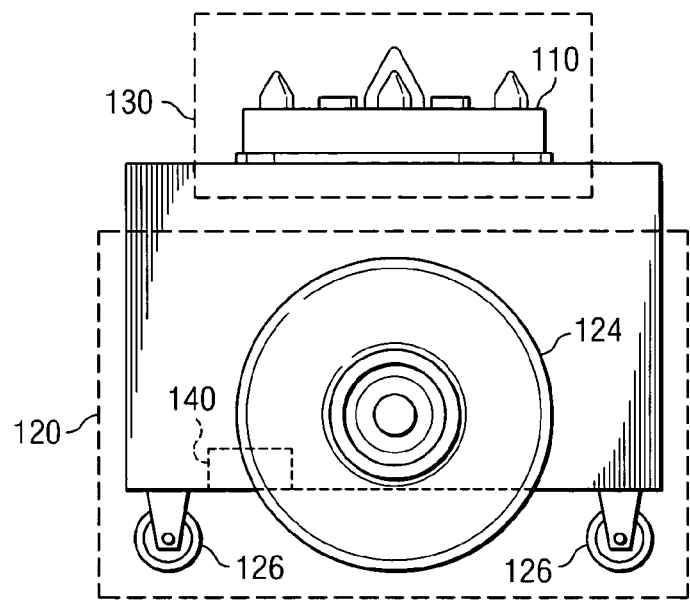
FIG. 2 represents a diagram of a mobile drive unit according to a particular embodiment.
Figure 2B:
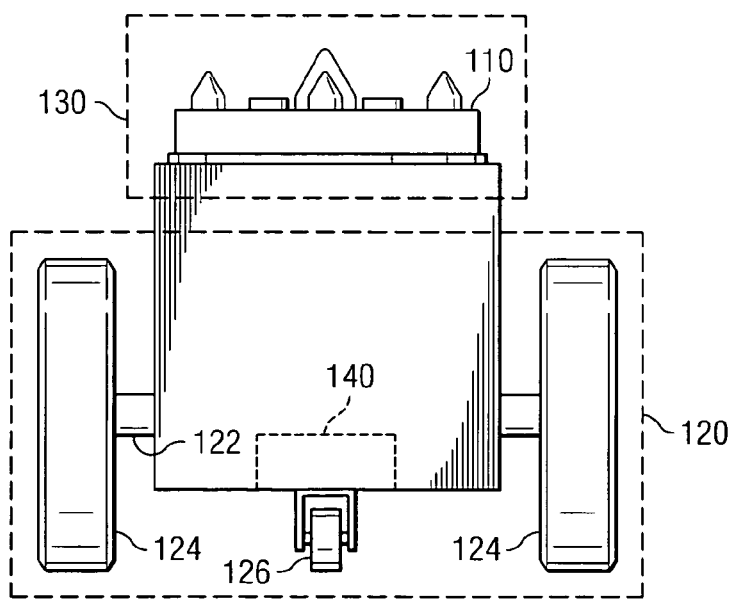

FIG. 2 includes a front and side view of a particular embodiment of mobile drive unit 20. Mobile drive unit 20 includes a docking head 110, a drive module 120, and a docking actuator 130. As illustrated, drive module 120 includes a motorized axle 122, motorized wheels 124, and stabilizing wheels 126.

Docking head 110 couples mobile drive unit 20 to inventory holder 30. Docking head 110 may additionally allow mobile drive unit 20 to maneuver inventory holder 30, such as by propelling inventory holder 30, rotating inventory holder 30, and/or moving inventory holder 30 in any other appropriate manner. FIG. 4 illustrates, in greater detail, components of a particular embodiment of docking head 110. Additionally, although the description below assumes that mobile drive unit 20 includes a particular embodiment of docking head 110 that rotates only as a result of the rotation of mobile drive unit 20 as a whole, alternative embodiments of docking head 110 may be capable of rotating independently from mobile drive unit 20.

Drive module 120 propels mobile drive unit 20 and, when mobile drive unit 20 is docked, inventory holder 30. Drive module 120 may represent any appropriate collection of one or more components operable to propel mobile drive unit 20. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In this embodiment, drive module 120 is also configured to rotate mobile drive unit 20 while mobile drive unit 20 remains stationary with respect to translational movement. More specifically, each of motorized wheels 124 are operable to rotate in different directions to cause mobile drive unit 20 to rotate.

As noted above, mobile drive unit 20 may autonomously control movement of mobile drive unit 20 and/or may receive movement commands from a management device, an operator, or any other suitable party or device. In general, movement of mobile drive unit 20 may, depending on the configuration of mobile drive unit 20 and inventory system 10, be controlled in whole or in part by mobile drive unit 20, or may be controlled entirely by external devices or parties. As also noted above, this description assumes that mobile drive unit 20 receives one or more commands from a remote component of inventory system 10 that identifies a particular inventory holder 30 to be moved by mobile drive unit 20 and a destination for that inventory holder 30. Mobile drive unit 20 then controls operation of drive module 120 to move mobile drive unit 20 and inventory holder 30 to respond to the commands.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft attached to the center of docking head 110. The motorized shaft is operable to lift docking head 110 as appropriate for docking with inventory holder 30. Although the description below refers to an embodiment of mobile drive unit 20 that includes a type of docking head 110 that rotates only as a result of the rotation of mobile drive unit 20 as a whole, in alternative embodiments docking actuator 130 may be capable of rotating docking head 110 independently from the rest of mobile drive unit 20.

Position sensor 140 may represent one or more sensors, detectors, or other components suitable for determining whether mobile drive unit 20 is appropriately positioned before initiating the docking process. For example, docking head 110 may be self-aligning to correct for positioning errors of mobile drive unit 20 within a certain tolerance range, and position sensor 140 may include detectors capable of detecting whether the position of mobile drive unit 20 relative to inventory holder 30 is acceptable based on that tolerance range. More specifically, mobile drive unit 20, in a particular embodiment, includes a camera and additional processing components that can determine the position of mobile drive unit 20 relative to particular components of inventory holder 30. Mobile drive unit 20 may then adjust the position of mobile drive unit 20 based on information provided by the components.

In operation, mobile drive unit 20 receives a command that identifies a location for a particular inventory holder 30. Drive module 120 moves mobile drive unit 20 to the location of inventory holder 30 in any suitable manner, based on the contents and configuration of drive module 120. For example, in the embodiment described above, drive module 120 moves mobile drive unit 20 by rotating motorized wheels 124 of drive module 120, as appropriate, to propel and turn mobile drive unit 20.

Figure 4A:
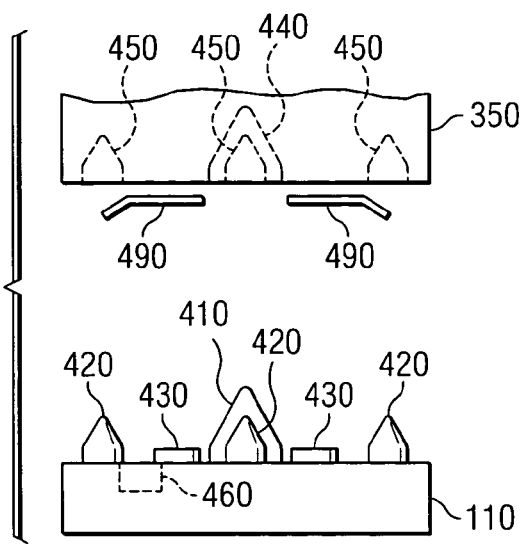
FIGS. 4A and 4B illustrate, respectively, a side view and a top view of a docking head according to a particular embodiment.
Figure 4B:
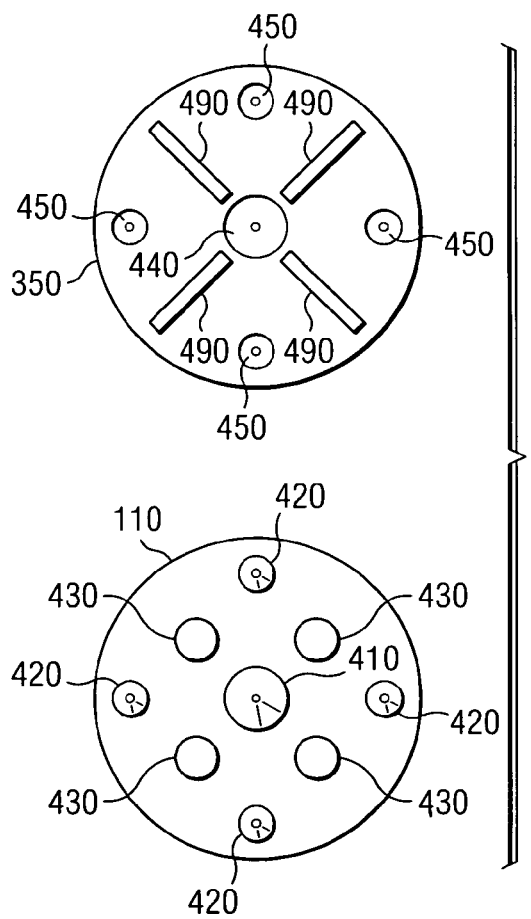

When mobile drive unit 20 arrives at or near the location of inventory holder 30, drive module 120 may maneuver mobile drive unit 20 so that docking head 110 is positioned opposite and near a docking plate of inventory holder 30. FIGS. 4A and 4B and the associated text describe docking head 110, the docking plate, and the docking process, according to a particular embodiment of mobile drive unit 20.

After properly positioning docking head 110, mobile drive unit 20 docks with inventory holder 30. In a particular embodiment, docking may involve docking actuator 130 moving docking head 110 upwards to bring docking head 110 into contact with components of inventory holder 30. Mobile drive unit 20 may also disable power to motorized wheels of drive module 120, shift a motor of drive module 120 into neutral, or otherwise configure drive module 120 to facilitate rolling of mobile drive unit 20 during docking. This may allow interaction between docking head 110 and inventory holder 30 to induce changes in the position and/or orientation of mobile drive unit 20 and/or inventory holder 30 for purposes of aligning mobile drive unit 20 and inventory holder 30. After docking, mobile drive unit 20 may align inventory holder 30 with a reference point within inventory system 10. Mobile drive unit 20 may also disengage a braking mechanism of inventory holder 30 in any appropriate manner, including by lifting inventory holder 30. Mobile drive unit 20 may also configure inventory holder 30 in any other suitable manner to facilitate movement. In general, mobile drive unit 20 may perform, during the docking process, any steps appropriate to couple mobile drive unit 20 to inventory holder 30 and prepare inventory holder 30 for movement. FIGS. 4A-4B, 5A-5G, and 6 illustrate various aspects of the docking process in greater detail for particular embodiments.

Once mobile drive unit 20 is docked with inventory holder 30, mobile drive unit 20 is capable of propelling inventory holder 30 and controlling other appropriate movement of inventory holder 30, such as rotation, of inventory holder 30. Mobile drive unit 20 may then move inventory holder 30 to the destination identified in the command, propelling and/or rotating inventory holder 30 as appropriate. Once mobile drive unit 20 and inventory holder 30 arrive at the destination, mobile drive unit 20 may additionally rotate inventory holder 30, for example, to present a particular face of inventory holder 30 to a packer or other party. Mobile drive unit 20 may then undock from inventory holder 30, as described below, or move inventory holder to another destination.

After arriving at an appropriate destination or at any other suitable time, mobile drive unit 20 may undock from inventory holder 30. Before undocking from inventory holder 30, mobile drive unit 20 may align mobile drive unit 20 with one or more gridpoints or reference points of any other suitable form. Position sensor 140 may include cameras, light detectors, magnetic detectors, or any other suitable components to detect reference markers specifying an appropriate location and/or orientation of inventory holder 30. Mobile drive unit 20 may then use these reference markers to position inventory holder 30 on a gridpoint within a workspace of inventory system 10.

Mobile drive unit 20 may execute any appropriate steps in undocking from inventory holder 30. For example, in undocking from inventory holder 30, mobile drive unit 20 may engage a braking mechanism of inventory holder 30 or otherwise configure inventory holder 30 to prevent movement of inventory holder 30. Additionally, as suggested above, mobile drive unit 20 may align inventory holder 30 with a reference point within inventory system 10. In a particular embodiment of inventory system 10, mobile drive unit 20, before undocking, aligns inventory holder 30 with a reference point along a first axis. Mobile drive unit 20 then undocks from inventory holder 30 and rotates. Mobile drive unit 20 then docks with inventory holder 30 again and aligns inventory holder 30 with the reference point along a second axis.

FIG. 3 illustrates inventory holder 30 in accordance with a particular embodiment. FIG. 3 illustrates the structure and contents of one side of inventory holder 30. In a particular embodiment, inventory holder 30 may comprise any number of faces with similar or different structure. As illustrated, inventory holder 30 includes a frame 310, a mobility element 330, a braking mechanism 340, and a docking plate 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. Additionally, in particular embodiments, frame 310 may represent a load-bearing surface mounted on mobility element 330. Inventory items 40 may be stored on such an inventory holder 30 by being placed on frame 310. In general, frame 310 may include internal and/or external storage space divided into any appropriate number of inventory bins 320 in any appropriate manner.

Frame 310 may also include a plurality of frame faces 312, representing faces of the external surface of frame 310. Furthermore, each inventory bin 320 may be associated with one or more particular frame faces 312 with inventory bins 320 located at a corner of frame 310 associated with both frame faces 312 forming the corner. In a particular embodiment, an inventory bin 320 may only be accessed through frame faces associated with the relevant inventory bin 320. Thus, when mobile drive unit 20 and inventory holder 30 arrive at a destination, mobile drive unit 20 may rotate inventory holder 30 to present a particular frame face 312 to allow a packer to select inventory items 40 from a particular inventory bin 320 associated with that frame face 312.

Additionally, in a particular embodiment, frame 310 may include a plurality of device openings 326 that allow mobile drive unit 20 to position docking head 110 adjacent docking plate 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 where docking plate is located in the illustrated embodiment. The length of legs 328 may be determined based on a height of mobile drive unit 20.

Mobility element 330 facilitates movement of inventory holder 30. Mobility element 330 may represent any combination of passive components that allow inventory holder 30 to be moved by mobile drive unit 20. For example, mobility element 330 may include wheels, skis, tracks, roller balls, and/or any other passive components appropriate to allow mobile inventory holder 30 to be rolled, slid, or otherwise moved. Furthermore, in particular embodiments, inventory holder 30 may include active components, such as motorized wheels, that assist mobile drive unit 20 in propelling inventory holder 30. Additionally, mobility element 330 may include components located external to inventory holder 30. For example, a particular embodiment of inventory system 10 may include pressurized air jets located in a floor of the workspace. When activated the pressurized air jets may partially lift inventory holder 30 off the ground making inventory holder 30 easier to propel. In the illustrated embodiment, mobility element 330 represents four frame wheels 332, each frame wheel 332 attached to the end of a particular leg 328.

Braking mechanism 340, when activated, disables mobility element 330 or otherwise negates the ability of mobility element 330 to facilitate movement of inventory holder 30. Braking mechanism 340 may include any components suitable to disable the particular type of mobility element 330 employed by inventory holder 30. For example, in a particular embodiment, mobility element 330 represents frame wheels 332, and braking mechanism 340 represents a damper capable, when activated, of immobilizing frame wheels 332.

Docking plate 350 is operable to receive a portion of docking head 110, to couple inventory holder 30 to mobile drive unit 20, and to facilitate the movement of inventory holder 30 by mobile drive unit 20. Additionally, docking plate 350 supports a portion or all of the weight of inventory holder 30 while inventory holder 30 is docked with mobile drive unit 20. Docking plate 350 may include any appropriate components suitable to receive a portion of docking head 110, couple inventory holder 30 to mobile drive unit 20, and facilitate control of inventory holder 30 by mobile drive unit 20. FIGS. 4A and 4B illustrate in greater detail the components of docking plate 350 according to a particular embodiment.

FIG. 4A illustrates a side view of docking head 110 and docking plate 350, while FIG. 4B illustrates a top view of docking head 110 and a bottom view of docking plate 350, according to particular embodiments of each. In the illustrated embodiment, docking head 110 includes a docking cone 410, one or more control spines 420, and a brake interface 430. Docking plate 350 includes a docking cavity 440, one or more control clefts 450, and a brake actuator 490.

Docking cone 410 provides a structural element of mobile drive unit 20 to which docking plate 350 can couple when docking head 110 is aligned with docking plate 350. Docking actuator 130, or other portions of mobile drive unit 20, may include components operable to extend docking cone 410 for the purposes of docking. Additionally, in a particular embodiment, docking head 110 is self-aligning so that docking cone 410 may correct, during docking, small misalignments between docking head 110 and docking plate 350. For example, in a particular embodiment, docking cone 410 may include a tapered conic portion and a vertical surface portion Because of the tapered surface of the conic portion, the upward motion of docking cone 410 during docking may also cause lateral movement in docking head 110 and/or mobile drive unit 20 that aligns docking head 110 concentrically with docking plate 350. As a result, mobile drive unit 20 may correct a certain range of misalignments by moving docking cone 410 toward and/or into docking plate 350. An example of this illustrated in greater detail in FIGS. 5A-5G. Inventory holder 30 may also be configured to move during docking. As a result, the upward motion of docking cone 410 may also induce lateral movement in inventory holder 30, in addition to or instead of mobile drive unit 20, to facilitate docking.

Control spines 420 allow mobile drive unit 20 to cause and/or control movement of inventory holder 30. In a particular embodiment, control spines 420 are protrusions in docking head 110 that are shaped to fit in control clefts 450 of docking plate 350 when mobile drive unit 20 is docked with inventory holder 30. As a result of the interaction between control spines 420 and control clefts 450, mobile drive unit 20 may induce translational and/or rotational movement in inventory holder 30 by rotating docking head 110 and, as a result, inducing the desired movement in control spines 420. As noted above, docking head 110 may rotate either through the independent movement of docking head 110 or the rigid movement of mobile drive unit 20 as a whole, depending on the configuration of mobile drive unit 20. One or more control spines 420 may then press against a control cleft 450 causing similar movement in inventory holder 30.

Brake interface 430 disengages braking mechanism 340 of inventory holder 30 when mobile drive unit 20 is docked to inventory holder 30. In the illustrated embodiment, brake interface 430 includes four pads that are pressed against elements of brake actuator 490 during docking as a result of interaction between mobile drive unit 20 and inventory holder 30.

Docking cavity 440 accepts docking cone 410 during docking. Docking cavity 440 may include components capable of locking docking cone 410 in place or otherwise securing inventory holder 30 to mobile drive unit 20 after docking. Additionally, docking cavity 440 may adjust or modify a position of docking head 110 relative to docking plate 350 to align mobile drive unit 20 and inventory holder 30 and correct for certain errors in the position of mobile drive unit 20. More specifically, docking cavity 440 may be configured to induce or modify ongoing movement in docking head 110 and/or mobile drive unit 20 parallel to a particular surface of inventory holder 30 on which docking plate 350 is located.

Control clefts 450 represent clefts, holes, divots, slits, or apertures of any other form suitable to receive control spines 420 when mobile drive unit 20 and inventory holder 30 are docked. In the illustrated embodiment, control clefts 450 represent depressions in docking plate 350 shaped to fit control spines 420 and configured so that rotation or translation of control spines 420 after mobile drive unit 20 has docked or while mobile drive unit 20 is docking with inventory holder 30 will cause, respectively, rotation and translation of inventory holder 30.

Additionally, control clefts 450 may be configured to adjust the position and/or rotational orientation of docking head 110, mobile drive unit 20, and/or inventory holder 30. In the illustrated embodiment, control clefts 450 are located along a circle concentric with docking cavity 440. In this embodiment, each control cleft includes a sloped or convex surface that is sloped towards a desired position on the boundary of the circle. As docking actuator 130 raises docking head 110 towards docking plate 350, movement of control spines 420 in following the sloped surface of control clefts 450 may induce rotation in mobile drive unit 20 and/or inventory holder 30, as discussed in greater detail bellow with respect to FIGS. 5A-5G.

Docking sensor 460 may detect successful completion of docking or of one or more of the steps included in the docking process. In general, docking sensor 460 may represent any components suitable to detect a position, orientation, movement, and/or any other characteristic or property of mobile drive unit 20 and/or inventory holder 30 relevant to the docking process. For example, docking sensor 460 may represent a magnetic sensor positioned to contact magnetic plates located on docking plate 350 when docking head 110 is brought into contact with docking plate 350. As a result, the magnetic sensor is capable of detecting when mobile drive unit 20 has successfully docked with inventory holder 30. In general, docking sensor 460 may include one or more distinct components capable of detecting any number of circumstances or events related to the docking of mobile drive unit 20 and inventory holder 30.

Additionally, docking sensor 460 may include additional components suitable for providing signals or other information to components that control mobile drive unit 20 to facilitate docking. As one example, while mobile drive unit 20 is configured to allow rolling, position sensor 140 may detect movement in mobile drive unit 20 induced by docking cavity 440 or control clefts 450 as a result of misalignment between docking head 110 and docking plate 350, as described above. In such an embodiment, docking sensor 460 may include circuitry capable of generating control signals to power motorized wheels of mobile drive unit 20. Docking sensor 460 may thus rotate the motorized wheels in a direction appropriate to assist in the alignment of docking head 110 and docking plate 350.

As another example, docking sensor 460 may represent components capable of detecting downward force exerted on mobile drive unit 20 by inventory holder 30. In such an embodiment, docking sensor 460 may also control operation of docking actuator 130 and continue to raise docking head 110 until the full weight of inventory holder 30 is shifted to mobile drive unit 20. As a result, docking sensor 460 in such an embodiment may be capable of maximizing the traction of motorized wheels of mobile drive unit 20.

Brake actuator 490 includes any appropriate components to allow brake interface 430 to control braking mechanism 340 during docking. Brake actuator 490 may represent, in part or in entirety, components of braking mechanism 340. Alternatively, brake actuator 490 may represent components connected to or in contact with components of braking mechanism 340. In the illustrated embodiment, brake actuator 490 includes levers that are pressed by the pads of the illustrated brake interface 430 during docking and that actuate components, such as disc brakes (not shown), fluidic brakes, pneumatic brakes, or any other suitable components to inhibit movement in any appropriate components of mobility element 330.

Although FIGS. 4A and 4B illustrate a particular docking head 110 and docking plate 350, each of a specific shape and structure, mobile drive unit 20 and inventory holder 30, respectively, may include docking head 110 and docking plate 350 of any shape and structure suitable to form a coupling between mobile drive unit 20 and inventory holder 30.

FIGS. 5A-5G illustrate operation of particular embodiments of docking head 110 and docking plate 350 during docking. For purposes of example, FIGS. 5A-5G illustrate particular embodiments of docking head 110 and docking plate 350 configured to couple while mobile drive unit 20 is positioned beneath inventory holder 30. As noted above, however, alternative embodiments of mobile drive unit 20 and inventory holder 30 may be configured to couple while mobile drive unit 20 is positioned in any appropriate manner relative to inventory holder 30.

Figure 5A:
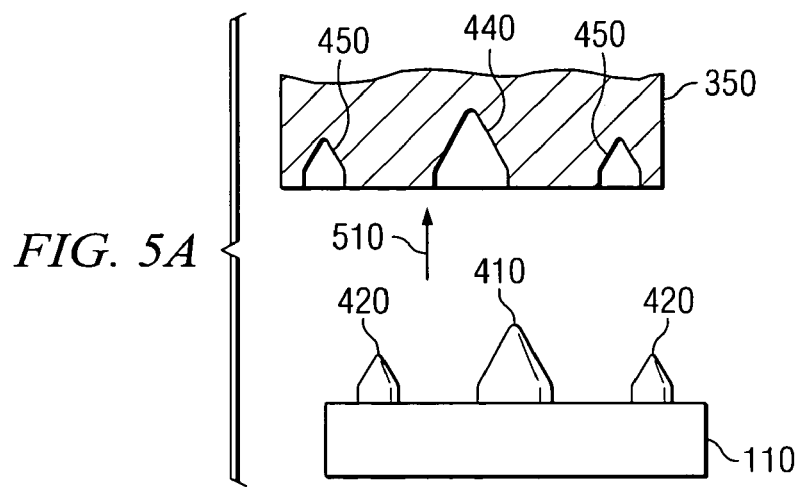
FIGS. 5A-5G show operation of various components of the mobile drive unit and the inventory holder during docking.
Figure 5B:
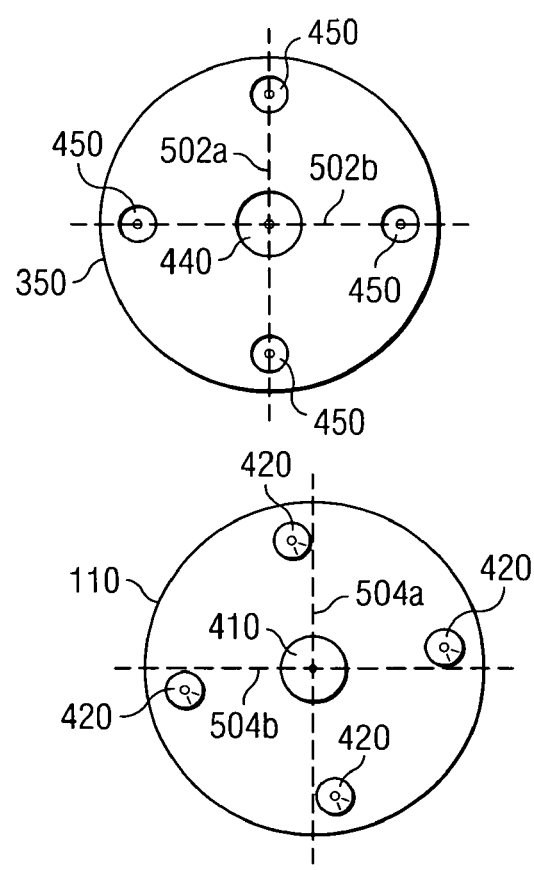

FIGS. 5A and 5B illustrate a starting position for docking head 110 after mobile drive unit 20 has positioned mobile drive unit 20 beneath inventory holder 30. FIG. 5A is a cross-sectional side view of docking head 110 and docking plate 350, while FIG. 5B includes a top view of docking head 110 and a bottom view of docking plate 350. As suggested by docking plate centerlines 502a-b and docking head centerlines 504a-b in FIG. 5B, mobile drive unit 20 is positioned so that the apex of docking cone 410 is slightly off-center of docking cavity 440. Additionally, the initial orientation of docking head 110 does not align with the orientation of docking plate 350. Docking actuator 130 begins raising docking head 110 as indicated by an arrow illustrating upward motion 510.

Figure 5C:
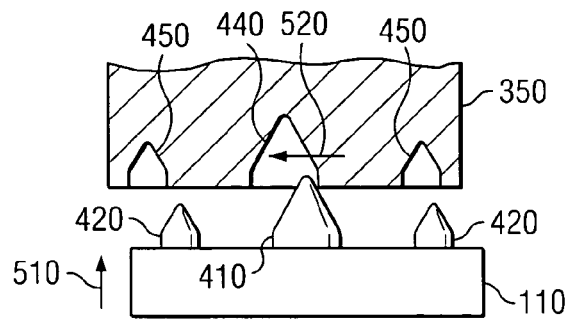

FIG. 5C shows a cross-sectional side view of docking head 110 and docking plate 350 during a first phase of the docking process. In the illustrated embodiment, the beginning of this first phase is marked by the apex of docking cone 410 entering docking cavity 440. In a particular embodiment, during this first phase, upward motion 510 causes docking cone 410 to move upward along the sloped surface of docking cavity 440. This induces a translational motion 520 in both docking head 110 and mobile drive unit 20. As indicated above, a particular embodiment of docking sensor 460 or position sensor 140 may detect translational motion 520 and rotate wheels of mobile drive unit 20 to assist in the alignment of docking head 110 and docking plate 350. Alternatively or additionally, mobile drive unit 20 may be configured for rolling and may passively allow mobile drive unit 20 to roll in the appropriate direction. Additionally, as noted above, particular embodiments of inventory holder 30 may be configured to move during docking. Thus, upward motion 510 of docking cone 410 may also induce translational motion in inventory holder 30, in addition to or instead of, inducing translational motion 520 in docking head 110 and/or mobile drive unit 20.

Figure 5D:
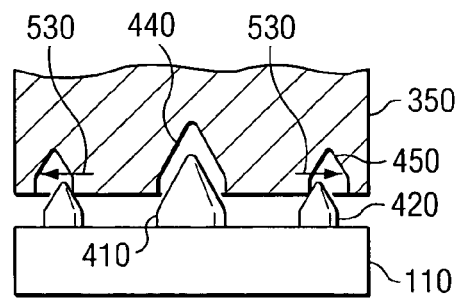
Figure 5E:
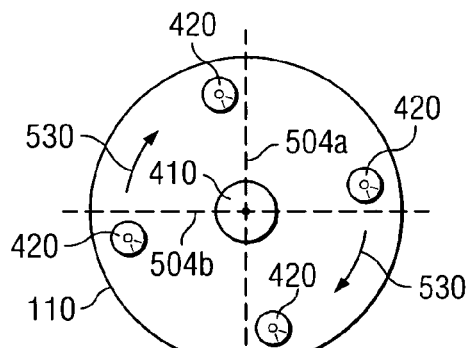

FIG. 5D illustrates a cross-sectional side view of docking head 110 and docking plate 350 during a second phase of the docking process, while FIG. 5E illustrates a top view of docking head 110 during the second phase. In the illustrated embodiment, the beginning of this phase is marked by the apex of control spines 420 entering control clefts 450. During this second phase, upward motion 510 causes control spines 420 to move upward along the sloped surfaces of control clefts 450. This induces rotational motion 530 in docking head 110 as shown in both FIGS. 5D and 5E. As indicated above, a particular embodiment of docking sensor 460 may detect rotational motion 530 and begin actively rotating mobile drive unit 20 in the direction of rotational motion 530, for example by rotating motorized wheels 124 of mobile drive unit 20 in opposite directions. Thus, mobile drive unit 20 may actively assist in the alignment of docking head 110 and docking plate 350. Alternatively or additionally, mobile drive unit 20 may be configured for rolling and may passively allow mobile drive unit 20 to rotate in the appropriate direction. Furthermore, as noted above, particular embodiments of inventory holder 30 may be configured to move during docking. Thus, upward motion 510 of control spines 420 may also induce rotational motion in inventory holder 30, in addition to or instead of, inducing rotational motion 530 in docking head 110 and/or mobile drive unit 20.

Figure 5F:
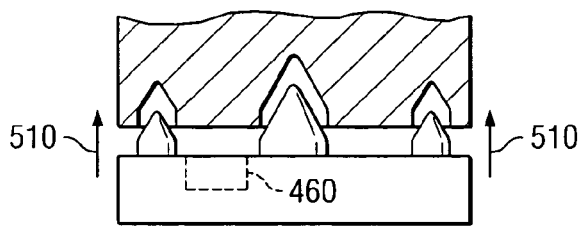

FIG. 5F illustrates a cross-sectional side view of docking head 110 and docking plate 350 during a third phase of the docking process. In the illustrated embodiment, this third phase is initiated once docking head 110 is aligned with docking plate 350. Docking actuator 130 maintains upward motion 510 of docking head 110 until docking sensor 460 detects contact between docking head 110 and docking plate 350. This third phase aligns vertical surfaces of docking cone 410 and control spines 420 with vertical interior surfaces of docking plate 350. As a result of this alignment, docking cone 410 and control spines 420 may transmit lateral forces to the interior surfaces of docking plate 350 that induce translational and/or rotational motion in inventory holder 30.

Figure 5G:
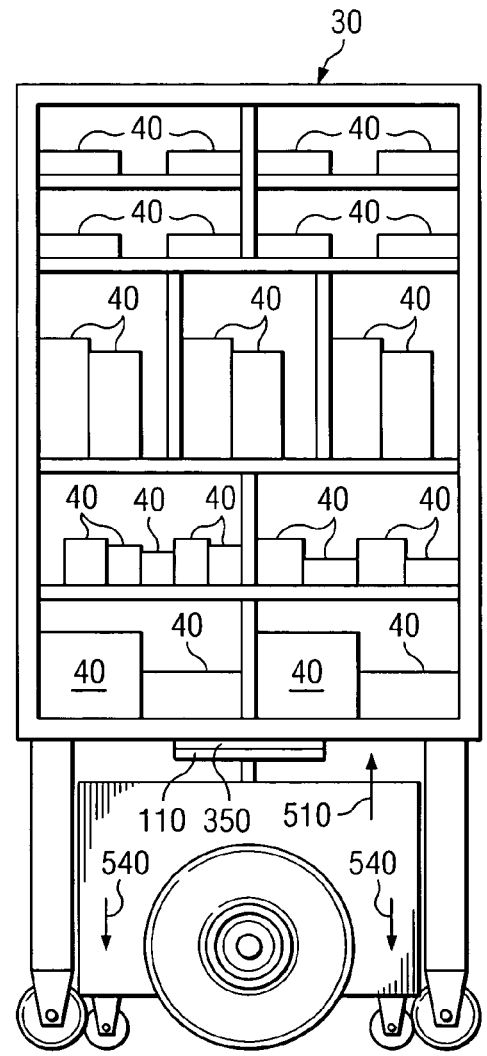

FIG. 5G illustrates mobile drive unit 20 and inventory holder 30 during a fourth phase of the docking process. In the illustrated embodiment, this fourth phase is initiated by docking sensor 460 detecting contact between docking head 110 and docking plate 350. After docking sensor 460 detects contact between docking head 110 and docking plate 350, docking actuator 130 may continue to raise docking head 110. As the weight of inventory holder 30 shifts from legs 328 to mobile drive unit 20, inventory holder 30 begins to exert a downward force 540 on mobile drive unit 20. Downward force 540 increases the traction between motorized wheels 124 and a floor of the workspace and improves the mobility of mobile drive unit 20. Mobile drive unit 20 then determines when sufficient force has been transferred to motorized wheels 124 and terminates the docking process. At this point, some or all of the weight of inventory holder 30 may be supported by docking plate 350.

Figure 6:
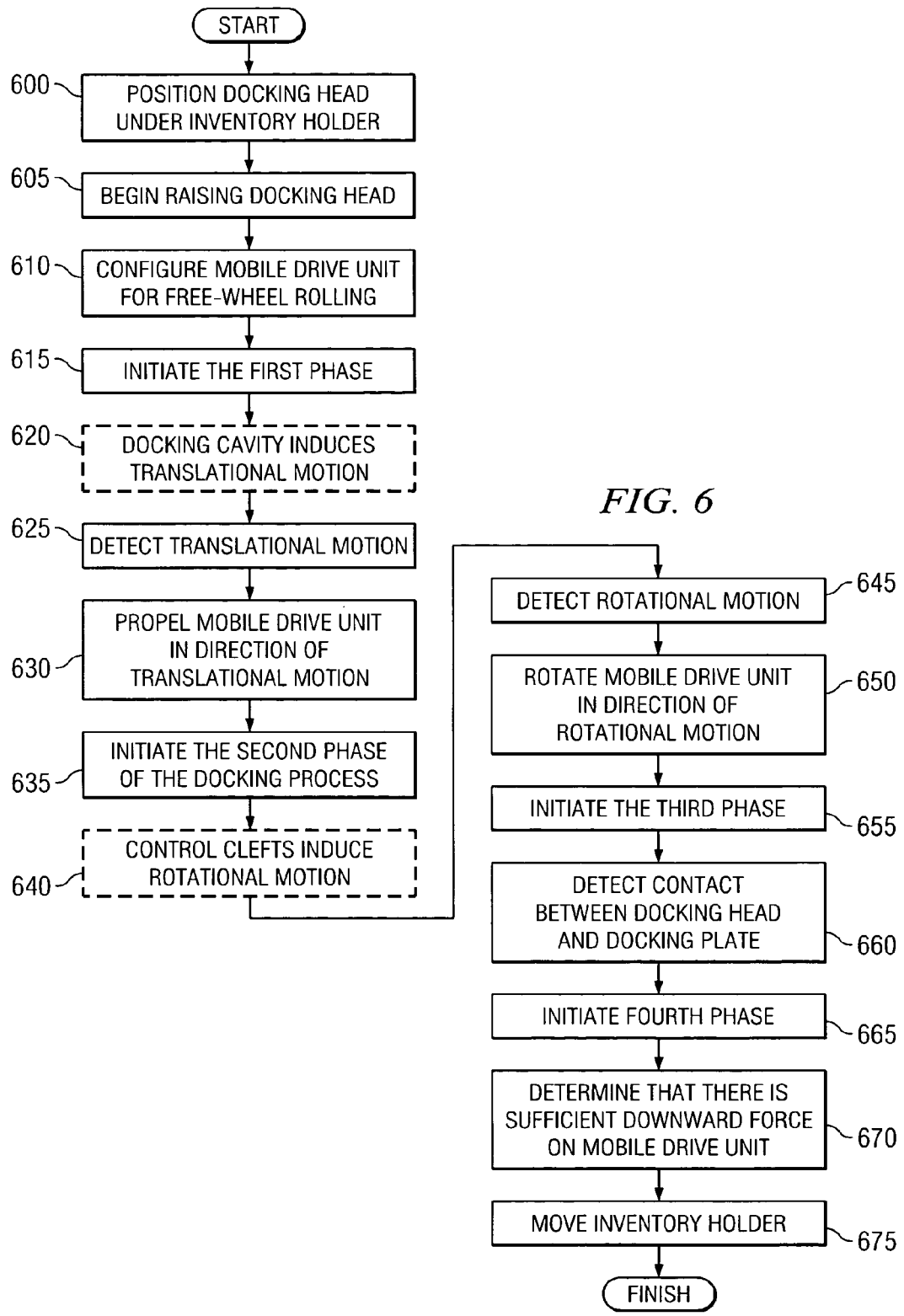
FIG. 6 is a flowchart illustrating operation of the mobile drive unit during docking.

FIG. 6 is a flowchart illustrating operation of a particular embodiment of mobile drive unit 20 during the docking process illustrated by FIGS. 5A-5G. Steps that represent actions taken or caused by components other than mobile drive unit 20 are shown in FIG. 6 as dotted line boxes. In particular, FIG. 6 describes operation of an embodiment of mobile drive unit 20 that actively assists in the alignment of docking head 110 and docking plate 350 by propelling or rotating mobile drive unit 20 as appropriate. In alternative embodiments, mobile drive unit 20 may, alternatively or additionally, provide passive assistance by configuring drive module 120 to allow mobile drive unit 20 to roll when interaction between docking head 110 and docking plate 350 result in lateral force being applied to mobile drive unit 20.

At step 600, mobile drive unit 20 positions docking head 110 under inventory holder 30. Mobile drive unit 20 or a component of mobile drive unit 20, such as docking actuator 130, begins raising docking head 110 at step 605. At step 610, mobile drive unit 20 configures drive module 120 to allow rolling of mobile drive unit 20.

At step 615, mobile drive unit 20 initiates the first phase of the docking process. As noted above, "initiating" the first phase may represent mobile drive unit 20 continuing to raise docking head 110 after the apex of docking cone 410 has entered docking cavity 440. At step 620, docking cavity 440 induces translational motion 520 in mobile drive units 20 to align docking head 110 and docking plate 350. At step 625, mobile drive unit 20 detects translational motion 520 in docking head 110 and/or mobile drive unit 20. In response, mobile drive unit 20, at step 630, propels mobile drive unit 20 in the direction of translational motion 520 to actively assist in aligning docking head 110 and docking plate 350. As noted above, in particular embodiments mobile drive unit 20 may instead provide only passive assistance by configuring drive module 120 to allow mobile drive unit 20 to roll in the direction of translational motion 520.

At step 635, mobile drive unit 20 initiates the second phase of the docking process. As with the first phase, "initiating" the second phase may represent mobile drive unit 20 continuing to raise docking head 110 after the apexes of control spines 420 have entered control clefts 450. At step 640, control clefts 450 induce rotational movement 530 in docking head 110 to align the orientation of docking head 110 with that of docking plate 350. Mobile drive unit 20 detects rotational movement 530 at step 645. At step 650, mobile drive unit 20 actively rotates mobile drive unit 20 in the direction of rotational motion 530 to assist in the alignment of docking head 110 and docking plate 350. Again, in particular embodiments mobile drive unit 20 may instead provide only passive assistance by configuring drive module 120 or docking head 110 to allow docking head 110 and/or mobile drive unit 20 to rotate in the direction of rotational motion 530.

At step 655, docking head initiates the third phase. "Initiating" the third phase may represent continuing to raise docking head 110 after docking head 110 and docking plate 350 have been aligned. At step 660, mobile drive unit detects contact between docking head 110 and docking plate 350.

Mobile drive unit 20 initiates the fourth phase, at step 665, in response to detecting this contact. "Initiating" the fourth phase, may represent continuing to raise docking head 110 after docking head 110 and docking plate have been brought into contact with one another. At step 670, mobile drive unit 20 determines that there is sufficient downward force on mobile drive unit 20 to provide adequate traction between motorized wheels 124 and the floor. Mobile drive unit 20 begins moving both mobile drive unit 20 and inventory holder 30 at step 675, completing the docking process.

As noted above, mobile drive unit 20 may additionally be configured to detect failed attempts at completing any or all of the steps illustrated in FIG. 6. Furthermore, mobile drive unit 20 may be configured to repeat anyone or more failed steps until those failed steps are successfully completed or until a predetermined maximum number of attempts have failed. For example, in a particular embodiment, if mobile drive unit 20 is unsuccessful completing a particular phase, mobile drive unit 20 may attempt to complete the phase again, repeating the relevant steps up to a maximum of three times. After three failed attempts, mobile drive unit 20 may abort the docking attempt and may contact a management device of inventory system 10 to notify the management device of the failed docking attempt.

Mobile drive unit 20 may also be configured to, in response to detecting a failed docking attempt, rotate and attempt to dock again. For example, a particular embodiment of mobile drive unit 20 may be capable of only rolling forward or backward along an axis defined by motorized wheels 124. Thus, docking plate 350 may only be capable of inducing translational motion 520 along that axis.

As a result, a particular embodiment of mobile drive unit 20 may complete the first phase of docking, raising docking head 110 until the apex of control spines 420 enter control clefts 450. This results in the alignment of docking head 110 and docking plate 350 along a first axis. Mobile drive unit 20 may then lower docking head 110 and rotate so that motorized wheels 124 define a second axis perpendicular to the first axis. Mobile drive unit 20 may then repeat the first phase of the docking process. This results in the alignment of docking head 110 and docking plate 350 along the second axis. Mobile drive unit 20 may then complete the remainder of the docking process as described above. Portions of this procedure may also be used during the drop off of inventory holder 30 at a storage location to ensure that inventory holder 30 is aligned to a grid of inventory system 10.

FIGS. 7A-7H illustrate steps in the operation of a particular embodiment of mobile drive unit 20 in moving inventory holder 30. Mobile drive unit 20 may be configured to move inventory holder 30 in any suitable manner. As a result, particular embodiments of mobile drive unit 20 may utilize movement techniques that provide particular benefits when utilized in inventory system 10. For example, FIGS. 7A-7H illustrate a particular embodiment of mobile drive unit 20 that provides space-saving benefits when operating in inventory system 10. More specifically, FIGS. 7A-7H show operation of mobile drive unit 20 as mobile drive unit 20 moves inventory holder 30 from a first position to a second position along a path that includes a ninety-degree turn. As shown, inventory system 10 includes a plurality of gridpoints 710a-c representing discrete physical locations within a workspace associated with inventory system 10. This procedure may also be used during the drop-off of an inventory holder 30 at a storage location to ensure that inventory holder 30 is aligned to the grid.

Figure 7A:
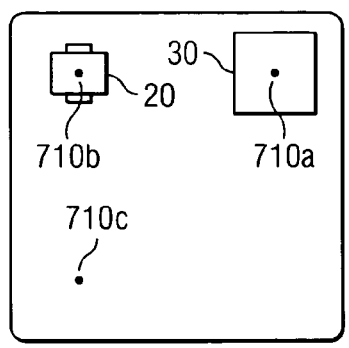
FIGS. 7A-7H illustrate movement of a mobile drive unit and inventory holder according to a particular embodiment of each.
Figure 7B:
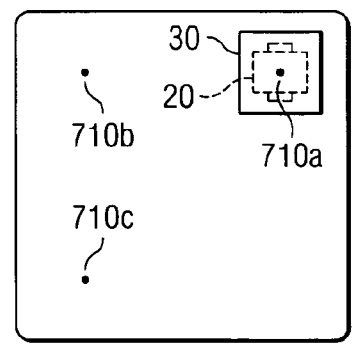
Figure 7C:
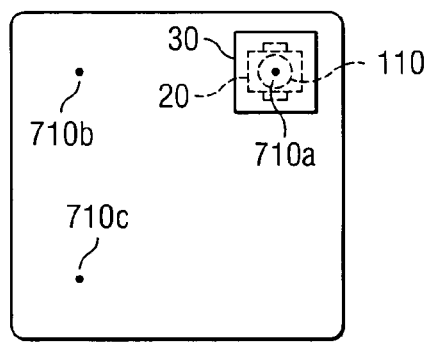
Figure 7D:
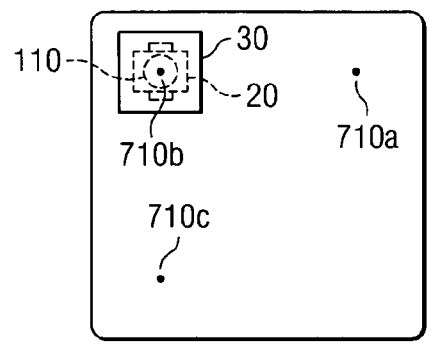
Figure 7E:
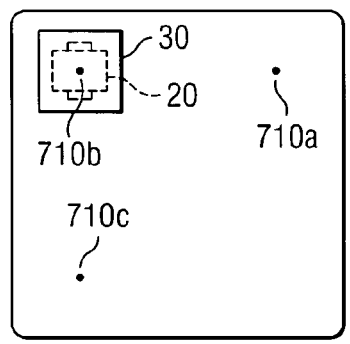
Figure 7F:
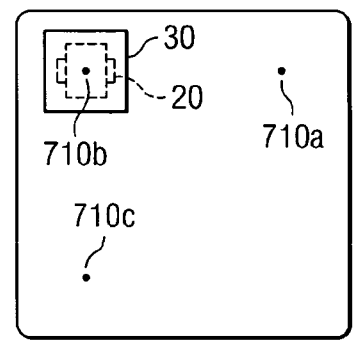

FIG. 7A shows a starting location of both mobile drive unit 20 and inventory holder 30. Initially, mobile drive unit 20 is located at gridpoint 710b, and inventory holder 30 is located at gridpoint 710a. As shown by FIG. 7B, mobile drive unit 20 moves to gridpoint 710a and positions itself under inventory holder 30. At this point, mobile drive unit 20 is undocked from inventory holder 30, as indicated by an absence of docking head 110 in FIG. 7B. As shown by FIG. 7C, mobile drive unit 20 then docks with inventory holder 30, indicated by the outline of docking head 110. Mobile drive unit 20 then propels mobile drive unit 20 and inventory holder 30 to gridpoint 710b as shown in FIG. 7D. At gridpoint 710b, mobile drive unit 20 undocks from inventory holder 30 as shown in FIG. 7E. Mobile drive unit 20 then rotates as shown in FIG. 7F.

Figure 7G:
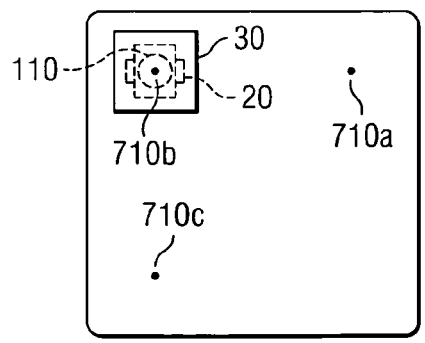
Figure 7H:
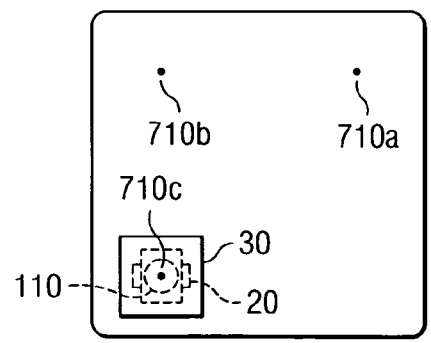

After rotating, mobile drive unit 20 again docks with inventory holder 30, as illustrated by FIG. 7G. Mobile drive unit 20 propels inventory holder 30 to gridpoint 710c, as shown in FIG. 7H. Mobile drive unit 20 may then undock from inventory holder 30, rotate inventory holder 30, or perform any additional movements or actions appropriate to complete the movement.

Figure 8:
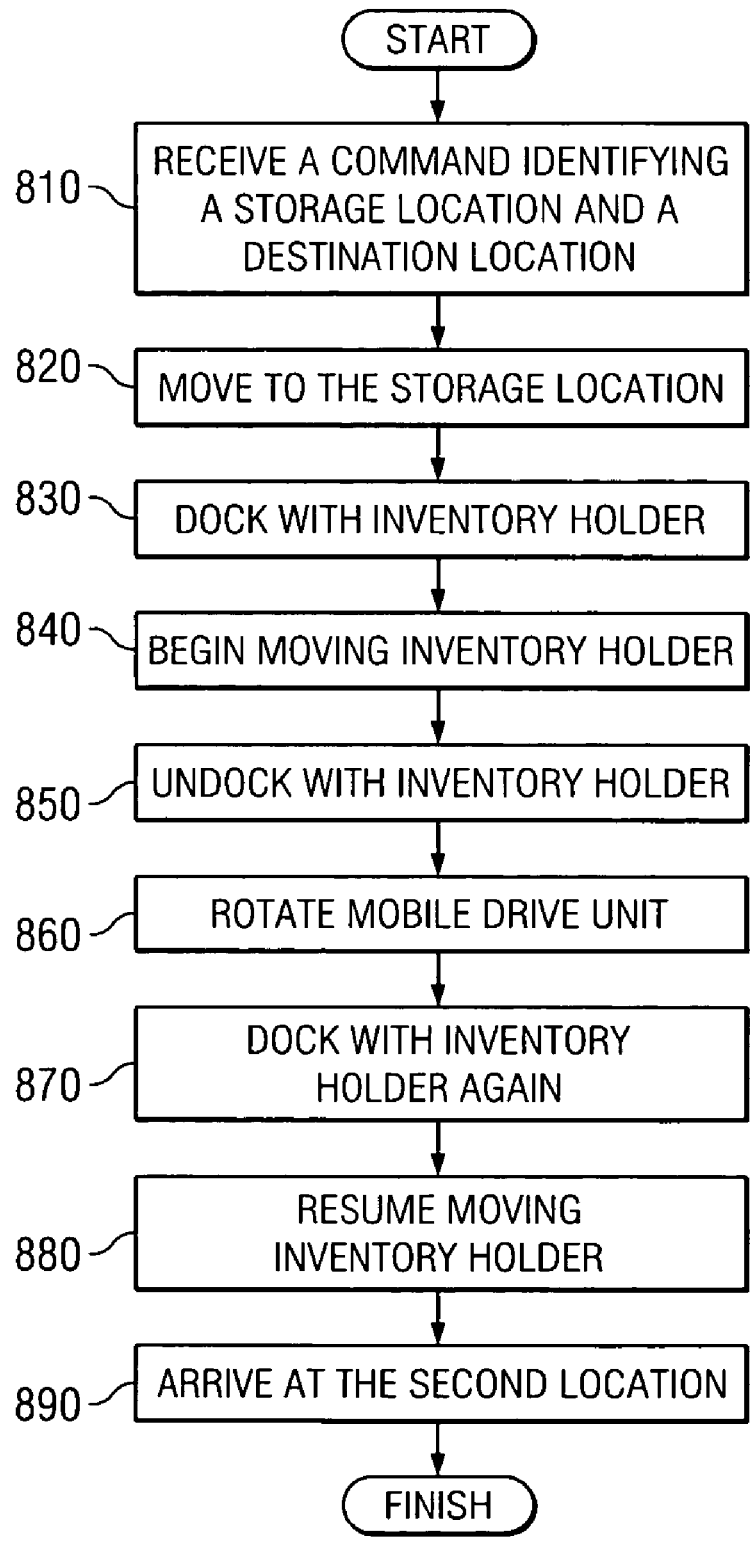
FIG. 8 is a flowchart illustrating, according to a particular embodiment, the operation of a mobile drive unit while moving an inventory holder.

FIG. 8 is a flow chart illustrating steps in the operation of mobile drive unit 20 in performing the movement illustrated in FIGS. 7A-7H. As noted with respect to FIGS. 7A-7H, this description illustrates operation of an embodiment of mobile drive unit 20 configured to move in a particular manner. Particular embodiments of mobile drive unit 20 may, however, be configured to move in other appropriate manners, depending on the characteristics and configuration of inventory system 10.

In particular, FIG. 8 illustrates operation of mobile drive unit 20 as mobile drive unit 20 docks with inventory holder 30, moves inventory holder 30, and turns inventory holder 30 to transport inventory holder 30 from a first location to a second location. At step 810, mobile drive unit 20 receives a command identifying a storage location and a destination location for inventory holder 30. Mobile drive unit 20 moves to the storage location at step 820. Mobile drive unit 20 docks with inventory holder 30 at step 830. At step 840, mobile drive unit 20 begins moving inventory holder 30.

At an appropriate point, mobile drive unit 20 may execute a turn in following a path to the second location. As part of executing the turn, mobile drive unit 20 undocks from inventory holder 30 at step 850. At step 860, mobile drive unit 20 rotates mobile drive unit 20. Mobile drive unit 20 docks with inventory holder 30 again at step 870. At step 880, mobile drive unit 20 resumes moving inventory holder 30. Mobile drive unit 20 may then perform any additional movement and execute any additional turns as appropriate to reach the second location. At step 890, mobile drive unit 20 arrives at the second location.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system for transporting inventory, comprising:
   an inventory holder, the inventory holder comprising:
      a frame operable to store inventory items;
      a docking plate operable to receive a docking head from underneath; and
      a braking mechanism operable to disable movement of the inventory holder when the inventory holder is not docked; and
   a mobile drive unit, comprising:
      a docking head operable to:
         couple to the docking plate when the mobile drive unit is positioned beneath the inventory holder and the docking head is raised to the docking plate;
         disengage the braking mechanism when the mobile drive unit is docked with the inventory holder; and
         decouple from the docking plate when the docking head is lowered; and
      a drive module operable to propel the mobile drive unit; and
   wherein the mobile drive unit is operable to move the inventory holder when the docking head is coupled to the inventory holder.

2. The system of claim 1, wherein the docking plate is further operable to, at least partially, support a weight of the frame while the inventory holder is docked with the mobile drive unit.

3. The system of claim 1, wherein the inventory holder further comprises a plurality of wheels.

4. The system of claim 1, wherein the frame comprises a plurality of inventory bins, each operable to store inventory items.

5. The system of claim 4, wherein the inventory bins are formed by adjustable dividers that divide the frame into the plurality of inventory bins.

6. The system of claim 1, wherein the frame further comprises a plurality of frame faces, each frame face including a device opening operable to allow the mobile drive unit to position the mobile drive unit under the inventory holder.

7. The system of claim 6, wherein the frame further comprises four legs, each leg extending from the frame, and wherein each face further comprises a device opening formed by two of the legs.

8. The system of claim 1, wherein the docking plate further comprises a control cleft operable to receive a portion of the docking head, and wherein the inventory holder is operable to be rotated by a force applied by the portion of the docking head received by the control cleft.

9. The system of claim 1, wherein the docking head further comprises a control spine, the control spine operable to rotate the inventory holder when the docking head rotates.

10. The system of claim 1, wherein the docking head is self-aligning with respect to the docking plate.

11. The system of claim 10, wherein the docking head includes a docking cone and wherein the docking plate includes a docking cavity, the docking cavity operable, during docking, to induce translational motion in one or more of the mobile drive unit and the inventory holder if the docking cone is not aligned with the docking cavity.

12. The system of claim 10, wherein the docking head includes a plurality of control spines, and wherein the docking plate includes a plurality of control clefts, wherein the control clefts are operable, during docking, to induce rotational motion in one or more of the mobile drive unit and the inventory holder if one or more of the control spines are not aligned with one or more of the control clefts.

13. A mobile drive unit for transporting inventory, comprising:
    a drive module, the drive module operable to position the mobile drive unit underneath an inventory holder; and
    a docking head operable to:
       couple to the inventory holder when the mobile drive unit is positioned beneath the inventory holder and the docking head is raised;
       disengage a braking mechanism of the inventory holder when the mobile drive unit is docked with the inventory holder; and
       decouple from the inventory holder when the docking head is lowered; and
    wherein the drive module is operable to move the mobile drive unit and, when the inventory holder is coupled to the mobile drive unit, move the inventory holder.

14. The mobile drive unit of claim 13, wherein the docking head further comprises a control spine, the control spine operable to rotate the inventory holder when the mobile drive unit is coupled to the inventory holder and the docking head rotates.

15. The mobile drive unit of claim 13, wherein the drive module further comprises a plurality of wheels, and wherein the drive module is operable to propel the mobile drive unit by rotating the plurality of wheels.

16. The mobile drive unit of claim 13, wherein the drive module is further operable to propel the mobile drive unit by propelling the mobile drive unit forward and operable to propel the mobile drive unit by moving the mobile drive unit backward.

17. The mobile drive unit of claim 13, wherein the drive module is further operable to propel the mobile drive unit by:
    propelling the mobile drive unit forward;
    propelling the mobile drive unit backward; and
    rotating the mobile drive unit.

18. A mobile drive unit for moving an inventory holder, comprising:
a docking head, comprising:
a self-aligning docking cone operable to:
couple to a docking plate of an inventory holder; and
align the docking head with the docking plate during coupling; and
a plurality of control spines, the control spines operable to rotate the inventory holder when the docking head is coupled to the inventory holder and the docking head is rotated; and
two motorized wheels, wherein the motorized wheels are operable to rotate in a common direction to propel the mobile drive unit and to rotate in opposite directions to rotate the mobile drive unit; and
a brake interface operable to disengage a braking mechanism of the inventory holder.

19. An inventory holder for storing inventory, comprising:
a docking plate comprising:
a plurality of control clefts, the control clefts operable to receive a docking head of a mobile drive unit, wherein the inventory holder is operable to be rotated by a force applied by the portion of the docking head positioned in the control clefts, and
a brake activator, wherein the brake activator is operable to disengage a braking mechanism of the inventory holder when the docking head is coupled to the docking plate;
a frame comprising:
a plurality of adjustable dividers, the adjustable dividers forming a plurality of storage bins operable to hold inventory items, the adjustable dividers further operable to be adjusted to alter sizes of the storage bins;
four legs extending from a bottom of the frame; and
four faces, each face offering access to one or more inventory bins and each face including an opening between two of the legs, each opening further operable to allow a mobile drive unit to move under the frame and adjacent to the docking plate;
four wheels, each wheel attached to a bottom of one of the legs and operable to facilitate movement of the inventory holder; and
the braking mechanism operable, when activated, to prevent the wheels from rolling.

20. A system for transporting inventory, comprising:
an inventory holder, the inventory holder comprising:
a frame operable to store inventory items; and
a docking plate operable to receive a docking head from underneath;
a braking mechanism operable to disable movement of the inventory holder when the inventory holder is not docked; and
a mobile drive unit, comprising:
a docking head operable to couple to the docking plate and disengage the braking mechanism when the docking head is coupled to the inventory holder; and
a drive module operable to propel the mobile drive unit; and
wherein the mobile drive unit is operable to move the inventory holder when the docking head is coupled to the inventory holder.

* * * * *

UNITED STATES PATENT AND TRADEMARK OFFICE
CERTIFICATE OF CORRECTION

| | |
|---|---|
| PATENT NO. | : 7,402,018 B2 |
| APPLICATION NO. | : 10/965523 |
| DATED | : July 22, 2008 |
| INVENTOR(S) | : Michael C. Mountz et al. |

It is certified that error appears in the above-identified patent and that said Letters Patent is hereby corrected as shown below:

Title Page, Item (75) Inventors, delete "David P. Lyons, II" and insert --David F. Lyons, II--

Signed and Sealed this

Eighteenth Day of November, 2008

JON W. DUDAS
*Director of the United States Patent and Trademark Office*